(12) United States Patent
Shimasaki

(10) Patent No.: US 11,873,436 B2
(45) Date of Patent: Jan. 16, 2024

(54) QUANTUM DOT AND METHOD FOR PRODUCING THE SAME

(71) Applicant: NS Materials Inc., Fukuoka (JP)

(72) Inventor: Toshiaki Shimasaki, Fukuoka (JP)

(73) Assignee: NS MATERIALS INC., Fukuoka (JP)

( * ) Notice: Subject to any disclaimer, the term of this patent is extended or adjusted under 35 U.S.C. 154(b) by 0 days.

(21) Appl. No.: 17/765,226

(22) PCT Filed: Sep. 28, 2020

(86) PCT No.: PCT/JP2020/036590
§ 371 (c)(1),
(2) Date: Mar. 30, 2022

(87) PCT Pub. No.: WO2021/065782
PCT Pub. Date: Apr. 8, 2021

(65) Prior Publication Data
US 2022/0348823 A1 Nov. 3, 2022

(30) Foreign Application Priority Data
Oct. 3, 2019 (JP) ................................. 2019-183077

(51) Int. Cl.
| | |
|---|---|
| *C09K 11/88* | (2006.01) |
| *C01B 19/00* | (2006.01) |
| *C09K 11/02* | (2006.01) |
| *C09K 11/58* | (2006.01) |
| *C09K 11/62* | (2006.01) |
| *B82Y 20/00* | (2011.01) |
| *B82Y 40/00* | (2011.01) |

(52) U.S. Cl.
CPC .......... *C09K 11/881* (2013.01); *C01B 19/002* (2013.01); *C09K 11/025* (2013.01); *C09K 11/582* (2013.01); *C09K 11/621* (2013.01); *B82Y 20/00* (2013.01); *B82Y 40/00* (2013.01); *C01P 2002/72* (2013.01); *C01P 2004/04* (2013.01); *C01P 2004/64* (2013.01)

(58) Field of Classification Search
CPC ... C09K 11/881; C09K 11/582; C09K 11/621; C01B 19/002
See application file for complete search history.

(56) References Cited

U.S. PATENT DOCUMENTS

| | | | |
|---|---|---|---|
| 2017/0002265 A1* | 1/2017 | Torimoto | H01L 33/502 |
| 2018/0291267 A1* | 10/2018 | Nagano | B82Y 40/00 |
| 2018/0346718 A1 | 12/2018 | Goethel et al. | |

FOREIGN PATENT DOCUMENTS

| | | | |
|---|---|---|---|
| CN | 103265949 | * | 8/2013 |
| JP | 2007-169525 | | 7/2007 |
| JP | WO2017-126164 | * | 7/2017 |
| JP | 2019-508550 | * | 3/2019 |
| WO | 2015/189636 | | 12/2015 |

OTHER PUBLICATIONS

Hamanaka et al, "Luminescence properties of chalcopyrite AgInS2 nanocrystals: Their origin and related electronic states", Jour. Luminesc, 133, (2013), pp. 121-124, Oct. 15, 2011.*
Kameyama et al., "Crystal Phase-Controlled Synthesis of Rod-Shaped AgInTe2 Nanocrystals for in vivo Imaging in the Near-Infrared Wavelength Region", Nanoscale, 2016, 6 pgs.
Zhao et al., "NIR-I-to-NIR-II fluorescent nanomaterials for biomedical imaging and cancer therapy", Journal of Materials Chemistry B, 2017, pp. 349-365.
Deng et al., "Near-infrared broadly emissive AgInSe2/ZnS quantum dots for biomedical optical imaging", Journal of Materials Chemistry C, 2014, pp. 7077-7085.
International Search Report issued in International Bureau of WIPO Patent Application No. PCT/JP2020/036590, dated Dec. 8, 2020, along with an English translation thereof.

* cited by examiner

*Primary Examiner* — C Melissa Koslow
(74) *Attorney, Agent, or Firm* — Greenblum & Bernstein, P.L.C.

(57) ABSTRACT

A quantum dot of the present invention is a nanocrystal represented by AgInE$_2$ (E is at least one of tellurium, selenium, and sulfur) containing silver, indium, and chalcogen, in which a fluorescence wavelength is within a range of a near-infrared region of 700 to 1500 nm, a fluorescence full width at half maximum is 150 nm or less, and a fluorescence quantum yield is higher than 20%. In the present invention, an average particle diameter is preferably 1 nm or more and 15 nm or less. In addition, a method for producing a quantum dot of the present invention includes synthesizing a quantum dot represented by AgInE$_2$ (E is at least one of tellurium, selenium, and sulfur) from a silver raw material, an indium raw material, and a chalcogenide raw material (chalcogenide is at least one of tellurium, selenium, and sulfur).

6 Claims, 4 Drawing Sheets

QUANTUM DOT AND METHOD FOR PRODUCING THE SAME

TECHNICAL FIELD

The present invention relates to a quantum dot emitting light in a near-infrared region and a method for producing the quantum dot.

BACKGROUND ART

Quantum dots are nanoparticles including about several hundreds to several thousands of atoms and having a particle diameter of about several nanometers to several tens of nanometers. Quantum dots are also called fluorescent nanoparticles, semiconductor nanoparticles, or nanocrystals.

The emission wavelength of quantum dots can be variously changed depending on the particle diameter and composition of nanoparticles. The performance of the quantum dot is expressed by, for example, a fluorescence quantum yield (Quantum Yield: QY) and a fluorescence full width at half maximum (Full Width at Half Maximum: FWHM).

The following Patent Literature and Non Patent Literatures describe $AgInTe_2$ quantum dots and $AgInSe_2$ quantum dots.

CITATION LIST

Patent Literature

Patent Literature 1: WO 2015-189636 A

Non Patent Literatures

Non Patent Literature 1: J. Mater. Chem. B, 2018, 6, pp 349 NIR-I-to-NIR-II fluorescent nanomaterials for biomedical imaging and cancer therapy Non Patent Literature 2: J. Mater. Chem. C, 2014, 2, pp 7077 Near-infrared broadly emissive $AgInSe_2$/ZnS quantum dots for biomedical optical imaging Non Patent Literature 3: Nanoscale, 2016, 8, pp 5435 Crystal phase-controlled synthesis of rod-shaped $AgInTe_2$ nanocrystals for in vivo imaging in the near-infrared wavelength region

SUMMARY OF INVENTION

Technical Problem

However, research and development for practical use of silver indium chalcogenide quantum dots have not been reported, and there is currently no practical use of silver indium chalcogenide quantum dots.

From the background as described above, there are strong demands for development of a simple method for synthesizing a silver indium chalcogenide quantum dot that is high-luminance and exhibits highly biocompatible near-infrared fluorescence, and elucidation of physical properties of a silver indium chalcogenide quantum dot synthesized by such a method.

The present invention has been made in view of such points, and an object thereof is to provide a silver indium chalcogenide quantum dot exhibiting high-luminance near-infrared fluorescence and a method for producing the quantum dot.

Solution to Problem

A quantum dot in the present invention is a nanocrystal represented by $AgInE_2$ (E is at least one of tellurium, selenium, and sulfur) containing silver, indium, and chalcogen, in which a fluorescence wavelength is within a range of a near-infrared region of 700 to 1500 nm, a fluorescence full width at half maximum is 150 nm or less, and a fluorescence quantum yield is higher than 20%.

In the present invention, an average particle diameter is preferably 1 nm or more and 15 nm or less.

In addition, a quantum dot in the present invention is a nanocrystal represented by $AgInE_2$ (E is at least one of tellurium, selenium, and sulfur) containing silver, indium, and chalcogen, in which a fluorescence wavelength is within a range of a near-infrared region of 700 to 1500 nm, and an average particle diameter is 1 nm or more and 15 nm or less.

In the present invention, it is preferable that a surface of the quantum dot is covered with a ligand.

In the present invention, it is preferable that the ligand is selected from at least one or two of phosphine-based, aliphatic thiol-based, aliphatic amine-based, and aliphatic carboxylic acid-based ligands.

A method for producing a quantum dot in the present invention includes synthesizing a quantum dot represented by $AgInE_2$ (E is at least one of tellurium, selenium, and sulfur) from a silver raw material, an indium raw material, and a chalcogenide raw material (chalcogenide is at least one of tellurium, selenium, and sulfur).

In the present invention, it is preferable that the quantum dot is synthesized in a solvent containing thiol.

In the present invention, it is preferable that the quantum dot is synthesized by sequentially adding the silver raw material, the indium raw material, the chalcogenide raw material, and a ligand in a high-boiling point solvent having a boiling point of 150° C. or higher and then raising a temperature of the resultant solution.

In the present invention, it is preferable that the raw material solution is synthesized by raising a reaction temperature from about 100° C. to about 260° C.

In the present invention, it is preferable that the method includes a step of dissolving one or two raw materials of the silver raw material, the indium raw material, the chalcogenide raw material, and the ligand in the high-boiling point solvent heated from 60° C. to 120° C., a step of sequentially adding the other raw materials, and a step of synthesizing the quantum dot by raising a temperature of the resultant solution to a reaction temperature of 180° C. or higher and 250° C. or lower after adding all of the raw materials.

Advantageous Effects of Invention

According to the quantum dot of the present invention, the fluorescence full width at half maximum in a near-infrared region can be narrowed, and high-luminance near-infrared fluorescence can be exhibited.

According to the method for producing a quantum dot of the present invention, it is possible to stably mass-produce silver indium chalcogenide quantum dots directly without going through an intermediate or the like by using an easy-to-use reactant.

DESCRIPTION OF EMBODIMENT

In recent years, near-infrared luminescent quantum dots not containing toxic regulation target heavy metals such as Cd and Pb have attracted attention. The present inventor has focused on silver indium chalcogenide (AgInE$_2$ (E is at least one of tellurium, selenium, and sulfur)) ternary quantum dots among the near-infrared luminescent quantum dots, have developed silver indium chalcogenide exhibiting direct strong fluorescence without going through an intermediate or the like by using an easy-to-use reactant, and have elucidated physical properties.

Hereinafter, an embodiment of the present invention (hereinafter, abbreviated as "embodiment") will be described in detail. The present invention is not limited to the following embodiment, and various modifications can be made within the range of the gist of the present invention.

Figure 1A:
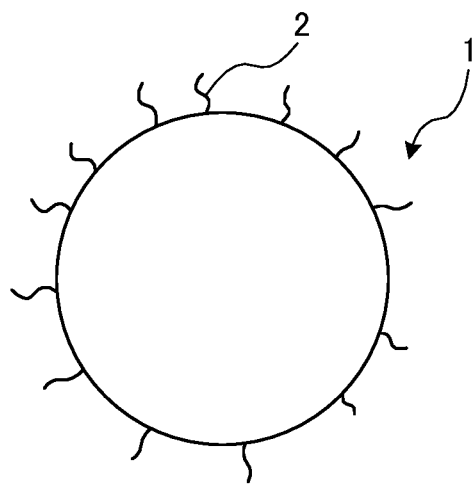
FIG. 1A is a schematic view of a quantum dot in an embodiment of the present invention.

FIG. 1A is a schematic view of a quantum dot in the present embodiment. A quantum dot 1 illustrated in FIG. 1A is a nanocrystal that is synthesized directly without going through an intermediate or the like by using an easy-to-use reactant.

In the present embodiment, the quantum dot 1 is a nanocrystals represented by AgInE$_2$ (E is at least one of tellurium (Te), selenium (Se), and sulfur (S)) containing silver (Ag), indium (In), and chalcogen. Although not limited, the quantum dot is preferably a nanocrystal containing AgInTe$_2$.

The quantum dot of the present embodiment has fluorescence characteristics by band edge light emission and exhibits the quantum size effect because of the size of the particle of the quantum dot.

Here, the term "nanocrystal" indicates a nanoparticle having a particle diameter of about 1 nm to several tens of nanometers. In the present embodiment, a number of quantum dots can be generated to have a uniform particle diameter. The term "uniform" indicates a state where 90% or more of particles are included within an average particle diameter±30%. As described above, in the present embodiment, it is possible to mass-produce fine and uniform high-quality quantum dots. In the present embodiment, the particle diameter of the quantum dot can be adjusted in a range of 1 nm or more and 15 nm or less.

Ag and In, and Te, Ag, In, and Se, or Ag, In, and S contained in the quantum dot are main components, and elements other than these elements may be contained. However, when a quantum dot is produced, it is preferable to satisfy the following conditions that a quantum dot can be synthesized without going through an intermediate or the like by using an easy-to-use reactant and by raising a temperature of the resultant solution from near 100° C. to near 260° C. in a high-boiling point solvent after sequentially adding raw materials.

By using such a synthesis method, quantum dots can be stably mass-produced without increasing the production cost, restricting the handling of a reactant, and complicating the production process.

The fluorescence wavelength of the quantum dot 1 of the present embodiment is in a range of a near-infrared region of 700 m to 1500 nm, and the fluorescence full width at half maximum thereof is 150 nm or less. The fluorescence full width at half maximum is preferably 130 nm or less and more preferably 120 nm or less. In the experiment described below, the fluorescence full width at half maximum of the quantum dot 1 is made to be about 100 nm. The term "fluorescence full width at half maximum" indicates the full width at half maximum expressing the spread of the fluorescence wavelength at the half intensity of the peak value of the fluorescence intensity in the fluorescence spectrum.

In the present embodiment, as described below, as a reaction system for synthesizing a quantum dot, an Ag raw material, an In raw material, a chalcogenide raw material, and a ligand that are raw materials are sequentially added to a high-boiling point solvent, and the temperature of the resultant solution is raised from near 100° C. to near 260° C. By producing a quantum dot on the basis of such a direct and simple synthesis reaction, the fluorescence quantum yield can be increased. The fluorescence full width at half maximum can also be narrowed, and specifically, a fluorescence full width at half maximum of 100 nm or less can be obtained.

As illustrated in FIG. 1A, it is preferable that a number of organic ligands 2 are coordinated on the surface of the quantum dot 1. Thus, the aggregation of the quantum dots 1 can be suppressed, and intended optical characteristics can be exhibited. The ligand that can be used in the reaction is not particularly limited, but for example, the following ligands are typically used.

(1) Aliphatic Primary Amines

Oleylamine: $C_{18}H_{35}NH_2$, stearyl (octadecyl)amine: $C_{18}H_{37}NH_2$, dodecyl (lauryl) amine: $C_{12}H_{25}NH_2$, decylamine: $C_{10}H_{21}NH_2$, and octylamine: $C_8H_{17}NH_2$ (2) Fatty Acids Oleic acid: $C_{17}H_{33}COOH$, stearic acid: $C_{17}H_{35}COOH$, palmitic acid: $C_{15}H_{31}COOH$, myristic acid: $C_{13}H_{27}COOH$, lauryl acid: $C_{11}H_{23}COOH$, decanoic acid: $C_9H_{19}COOH$, and octanoic acid: $C_7H_{15}COOH$ (3) Thiols Octadecanethiol: $C_{18}H_{37}SH$, hexanedecanethiol: $C_{16}H_{33}SH$, tetradecanethiol: $C_{14}H_{29}SH$, dodecanethiol: $C_{12}H_{25}SH$, decanethiol: $C_{10}H_{21}SH$, and octanethiol: $C_8H_{17}SH$ (4) Phosphines Trioctylphosphine: $(C_8H_{17})_3P$, triphenylphosphine: $(C_6H_5)_3P$, and tributylphosphine: $(C_4H_9)_3P$ (5) Phosphine Oxides Trioctylphosphine oxide: $(C_8H_{17})_3P=O$, triphenylphosphine oxide: $(C_6H_5)_3P=O$, and tributylphosphine oxide: $(C_4H_9)_3P=O$ The fluorescence quantum yield (Quantum Yield) of the quantum dot 1 in the present embodiment is 5% or more. The fluorescence quantum yield is preferably 10% or more, more preferably 20% or more, further preferably 25% or more, and even more preferably 30% or more. As described above, in the present embodiment, the fluorescence quantum yield of the quantum dot can be increased. In the experiment described below, the fluorescence quantum yield of the quantum dot 1 is made to be about 22%.

In the present embodiment, the fluorescence wavelength can be freely controlled to be about 700 nm or more and 1500 nm or less. The quantum dot in the present embodiment is a solid solution mainly containing $AgInE_2$ that uses a chalcogen element in addition to silver and indium. In the present embodiment, the fluorescence wavelength can be controlled by adjusting the heating temperature and the heating time, the particle diameter of the quantum dot, and the composition of the quantum dot. The fluorescence wavelength is preferably 800 nm or more and more preferably 1100 nm or more.

Figure 1B:
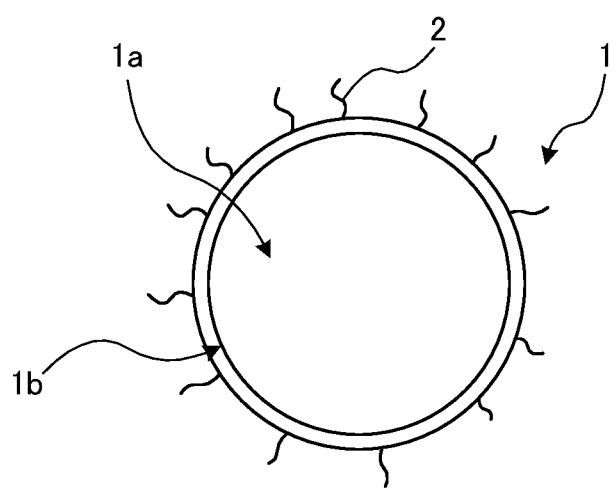
FIG. 1B is a schematic view of the quantum dot in the embodiment of the present invention.

In the present embodiment, as illustrated in FIG. 1B, the quantum dot 1 may be a core-shell structure having a core 1a and a shell 1b that covers a surface of the core 1a. As illustrated in FIG. 1B, it is preferable that a number of organic ligands 2 are coordinated on the surface of the quantum dot 1.

The core 1a illustrated in FIG. 1B is $AgInE_2$. Similarly to the core 1a, the shell 1b does not contain regulation target heavy metals such as Cd, Hg, and Pd or substances derived from highly reactive reactants typified by metal amides or organolithium compounds.

The shell 1b may exist as a solid solution on the surface of the core 1a. In FIG. 1B, the boundary between the core 1a and the shell 1b is indicated by a dotted line, and this means that the boundary between the core 1a and the shell 1b may be either recognizable or not by the analysis.

However, in the present embodiment, the quantum dot 1 having only the core 1a without using the shell 1b, that is, with a single core of FIG. 1A can obtain fluorescence characteristics having a fluorescence wavelength in a near-infrared region of 700 to 1500 nm and a fluorescence full width at half maximum of 150 nm or less.

Next, a method for producing a quantum dot of the present embodiment will be described. In the present embodiment, a quantum dot represented by $AgInE_2$ (E is at least one of tellurium, selenium, and sulfur) is synthesized from a silver raw material, an indium raw material, and a chalcogenide raw material (chalcogenide is at least one of tellurium, selenium, and sulfur).

Here, in the present embodiment, the Ag raw material for $AgInE_2$ is not particularly limited, but for example, the following organic silver reagent or inorganic silver reagent can be used. That is, silver(I) acetate: Ag(OAc) as an acetate, silver stearate: $Ag(OC(=O)C_{17}H_{35})$, silver oleate: $Ag(OC(=O)C_{17}H_{33})$, silver myristate: $Ag(OC(=O)C_{13}H_{27})$ silver dodecanoate: $Ag(OC(=O)C_{11}H_{23})$, and silver acetylacetonate: Ag(acac) as fatty acid salts, a monovalent compound as a halide can be used, and silver(I) chloride: AgCl, silver(I) bromide: AgBr, silver(I) iodide: AgI, and the like can be used.

In the present embodiment, as for tellurium (Te), an organic tellurium compound (organic chalcogen compound) or an inorganic tellurium compound is used in the form of a solid as it is or is dissolved in a high-boiling point solvent and then used as a raw material. In particular, although the structure of the compound is not limited, for example, trioctylphosphine telluride: $(C_8H_{17})_3P=Te$ obtained by dissolving tellurium in trioctylphosphine, tributylphosphine telluride: $(C_4H_9)_3P=Te$ obtained by dissolving tellurium in tributylphosphine, a solution obtained by dissolving tellurium at a high temperature in a high-boiling point solvent that is a hydrocarbon with a long chain, such as octadecene, or the like can be used.

In the present embodiment, in the case of solid-solubilizing selenium (Se), as for selenium, an organic selenium compound (organic chalcogen compound) or an inorganic selenium compound is used in the form of a solid as it is or is dissolved in a high-boiling point solvent and then used as a raw material. In particular, although the structure is not limited, for example, trioctylphosphine selenium: $(C_8H_{17})_3P=Se$ obtained by dissolving selenium in trioctylphosphine, tributylphosphine selenium: $(C_4H_9)_3P=Se$ obtained by dissolving selenium in tributylphosphine, a solution obtained by dissolving selenium at a high temperature in a high-boiling point solvent that is a hydrocarbon with a long chain, such as octadecene, or the like can be used.

In the present embodiment, in the case of solid-solubilizing sulfur (Se), as for sulfur, an organic sulfur compound (organic chalcogen compound) or an inorganic sulfur compound is used in the form of a solid as it is or is dissolved in a high-boiling point solvent and then used as a raw material. In particular, although the structure is not limited, for example, trioctylphosphine sulfide: $(C_8H_{17})_3P=S$ obtained by dissolving sulfur in trioctylphosphine, tributylphosphine sulfide: $(C_4H_9)_3P=S$ obtained by dissolving sulfur in tributylphosphine, a solution obtained by dissolving sulfur at a high temperature in a high-boiling point solvent that is a hydrocarbon with a long chain, such as octadecene, or the like can be used.

In the present embodiment, an organic silver compound or an inorganic silver compound is added to a high-boiling point solvent and dissolved. As the solvent, octadecene, which is a saturated hydrocarbon or an unsaturated hydrocarbon with a high boiling point of 150° C. or higher, can be used. Besides this, dodecylbenzene: $C_6H_5(CH_2)_{11}CH_3$ as a high-boiling point aromatic solvent and butyl butyrate: $C_4H_9COOC_4H_9$, benzyl butyrate: $C_6H_5CH_2COOC_4H_9$, or the like as a high-boiling point ester-based solvent can be used, and an aliphatic thiol-based, aliphatic amine-based, or fatty acid-based compound, or an aliphatic phosphorus compound can also be used as the solvent.

At this time, the reaction temperature is set in a range of 100° C. or higher and 260° C. or lower to dissolve a silver compound. The reaction temperature is preferably a lower temperature, which is 100° C. or higher and 240° C. or lower, more preferably a further lower temperature, which is 100° C. or higher and 230° C. or lower, and even more preferably 80° C. or higher and 220° C. or lower.

In the present embodiment, although the reaction method is not limited to a particular method, it is important to raise a temperature from a low temperature of about 100° C. to a high temperature of about 260° C. (preferably about 230° C.) when $AgInTe_2$, $AgInSe_2$, and $AgInS_2$ are synthesized, in order to obtain a quantum dot having a high fluorescence quantum yield and a narrow full width at half maximum. Therefore, it is preferable to synthesize a quantum dot by dissolving one or two kinds of raw materials in a high-boiling point solvent heated to about 100° C., sequentially adding other raw materials to this solution, and then raising a temperature of the resultant solution to about 260° C.

In the present embodiment, in order to obtain $AgInE_2$ having a high fluorescence quantum yield and a narrow fluorescence full width at half maximum, it is preferable to add 1 to 200 equivalents of thiol to Te, Se, or S in the reaction of the silver raw material, the indium raw material, and the chalcogen raw material which are precursors, and in order to obtain a quantum dot having a high fluorescence intensity, it is more preferable to add 5 to 1000 equivalents of thiol, and even more preferable to add 50 to 10000 equivalents of thiol. Although thiol is not limited to a particular kind, for example, octadecanethiol: $C_{18}H_{37}SH$, hexanedecanethiol: $C_{16}H_{33}SH$, tetradecanethiol: $C_{14}H_{29}SH$, dodecanethiol: $C_{12}H_{25}SH$, decanethiol: $C_{10}H_{21}SH$, octanethiol: $C_8H_{17}SH$, and the like can be used.

In the present embodiment, when the reaction is performed, a compound having an auxiliary role of releasing the metal of the precursor into the reaction solution by coordination, chelate, or the like is required.

Examples of the compound having the above-mentioned role include ligands that can be complexed with silver. For example, phosphorus-based ligands, amine-based ligands, thiol-based ligands, and carboxylic acid-based ligands are preferable, and among them, thiol-based ligands are particularly preferable because of their high efficiency.

Thus, the reaction among Ag, In, and chalcogen is performed as appropriate, and a fluorescent quantum dot mainly containing Ag, In, and chalcogen and having a high fluorescence quantum yield in a near-infrared region and a narrow fluorescence full width at half maximum can be produced.

The method for producing a quantum dot of the present embodiment preferably includes a step of dissolving one or two raw materials of the silver raw material, the indium raw material, the chalcogenide raw material, and the ligand, which are described above, in the high-boiling point solvent heated from 60° C. to 120° C., a step of sequentially adding the other raw materials, and a step of synthesizing the quantum dot by raising a temperature of the resultant solution to a reaction temperature of 180° C. or higher and 250° C. or lower after adding all of the raw materials.

Thereby, it is possible to safely mass-produce silver indium chalcogenide exhibiting direct strong fluorescence without going through an intermediate or the like by using an easy-to-use reactant.

EXAMPLES

Hereinafter, effects of the present invention will be described by means of Examples and Comparative Examples of the present invention. The present invention is not limited by the following Examples at all.

<Raw Materials>

In the present invention, the following raw materials were used to synthesize a silver chalcogenide compound (AgInE$_2$-based) quantum dot emitting light in a near-infrared region.

(Solvent)

Octadecene: manufactured by Aldrich Co., Ltd., manufactured by Idemitsu Kosan Co., Ltd.

(Chalcogen Raw Material)

Tellurium (4N: 99.99%): manufactured by Shinko Chemical Co., Ltd. or manufactured by Aldrich Co., Ltd.

(Indium Raw Material)

Indium acetate: manufactured by Shinko Chemical Co., Ltd.

(Silver Raw Material)

Silver acetate: manufactured by KISHIDA CHEMICAL Co., Ltd.

(Ligands)

Trioctylphosphine: manufactured by HOKKO CHEMICAL INDUSTRY CO., LTD.

Dodecanethiol: manufactured by Arkema S.A.

<Measurement Instruments>

Fluorescence spectrometer: NIRQuest512-1.9 manufactured by Ocean Optics, Inc.

Ultraviolet-visible light spectrophotometer: V-770 manufactured by Hitachi, Ltd.

X-ray diffractometer (XRD): D2 PHASER manufactured by Bruker

Scanning transmission electron microscope (STEM): SU9000 manufactured by Hitachi, Ltd.

Example 1

Into a 100 mL reaction container, 33.4 mg of silver acetate: Ag(OAc), 5.0 mL of dodecanethiol: DDT, and 5.0 mL of octadecene: ODE were put. Then, the raw materials were dissolved by being heated while stirring at 120° C. for 10 minutes in an inert gas (N$_2$) atmosphere.

To this solution, 116.8 mg of indium acetate: In(OAc)$_3$ was added, and the resultant solution was further heated while stirring for 10 minutes at the same temperature.

To this solution, 0.4 mL of tellurium dissolved in TOP: Te-TOP was added, and the reaction solution was heated to 200° C. and stirred for 40 minutes while heating.

Ethanol was added to the obtained reaction solution to generate a precipitate, and the precipitate was collected through centrifugal separation. Then, toluene was added to this precipitate and dispersed to obtain a dispersion solution of AgInTe$_2$ particles.

Figure 2:
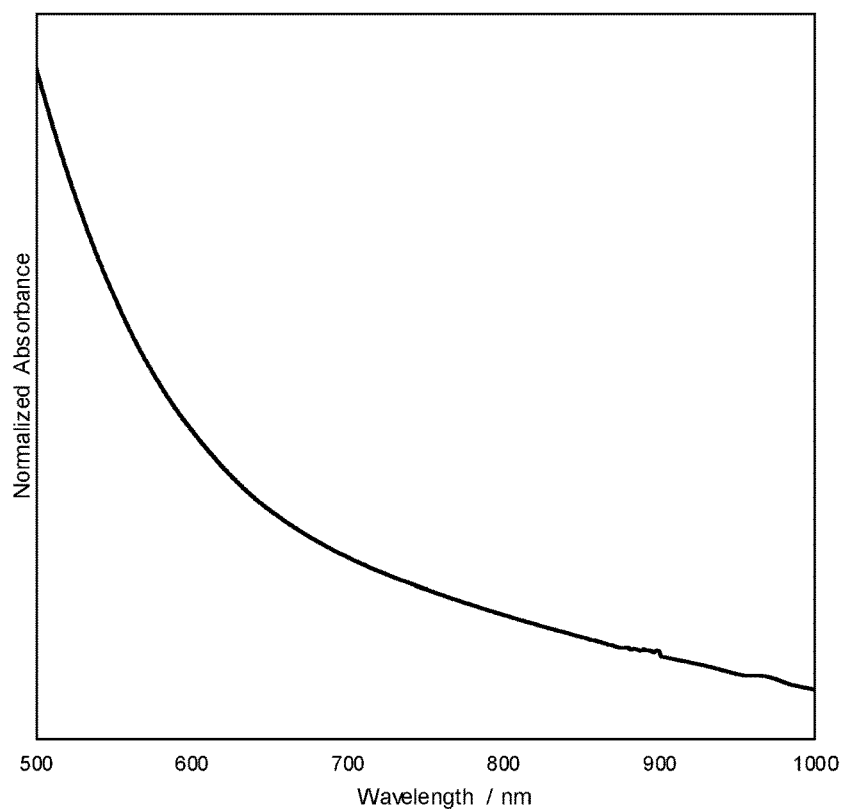
FIG. 2 shows an absorption spectrum of AgInTe$_2$ in Example 1.
Figure 3:
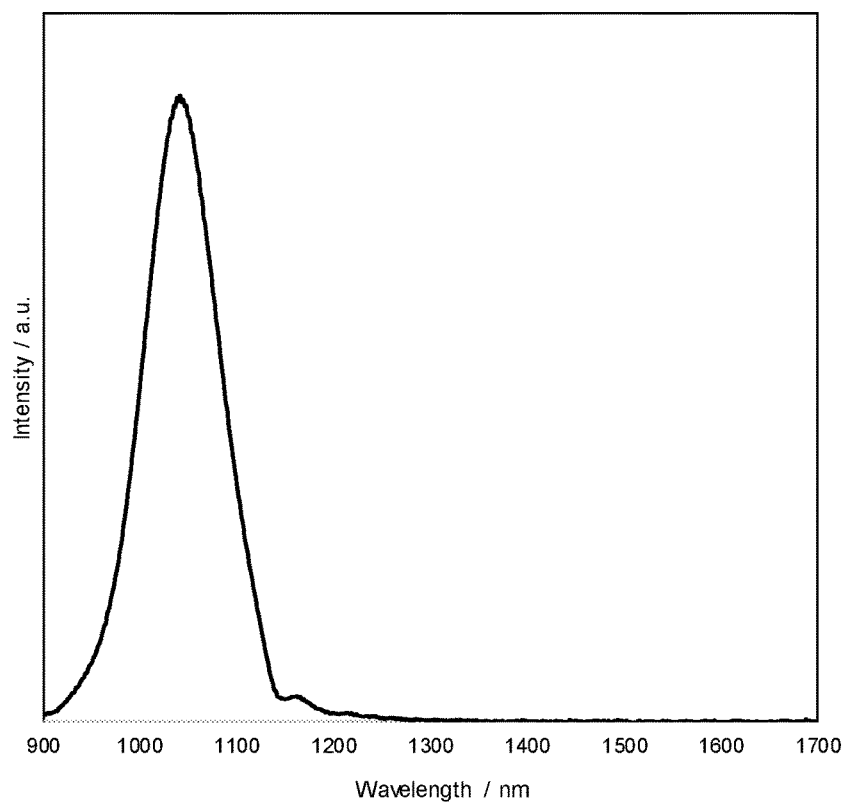
FIG. 3 shows a fluorescence (photoluminescence: PL) spectrum of AgInTe$_2$ in Example 1.

The obtained dispersion solution was measured by an ultraviolet-visible and fluorescence spectrometer. As a result, as shown in the measurement result of the ultraviolet-visible near-infrared absorption spectrum in FIG. 2, an absorption maximum was obtained at 962.0 nm. As shown in the measurement result of near-infrared fluorescence spectrum in FIG. 3, a fluorescence maximum was obtained at 1038.0 nm. The fluorescence full width at half maximum was about 100 nm, and the fluorescence quantum yield was 22%.

Figure 5:
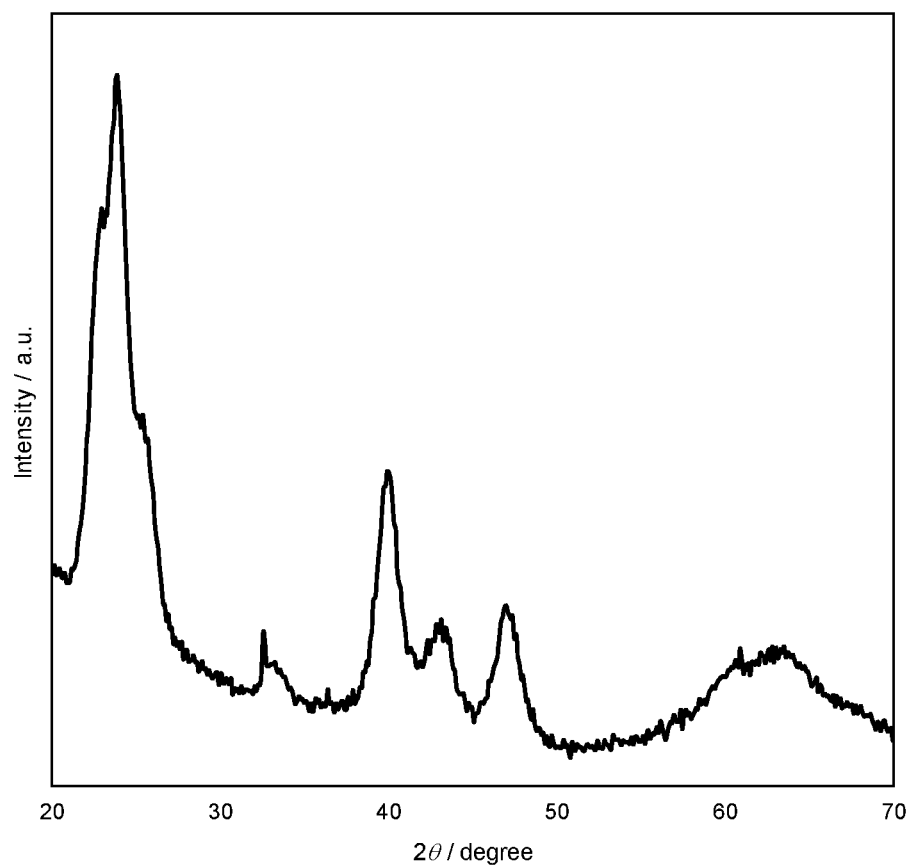
FIG. 5 shows an X-ray diffraction (XRD) spectrum of AgInTe$_2$ in Example 1.

From the peak value of the XRD spectrum of AgInTe$_2$ shown in FIG. 5, it was verified that an AgInTe$_2$ solid solution was generated.

Example 2

Into a 100 mL reaction container, 66.8 mg of silver acetate: Ag(OAc), 15.0 mL of dodecanethiol: DDT, and 15.0 mL of octadecene: ODE were put. Then, the raw materials were dissolved by being heated while stirring at 120° C. for 10 minutes in an inert gas (N$_2$) atmosphere.

To this solution, 233.6 mg of indium acetate: In(OAc)$_3$ was added, and the resultant solution was further heated while stirring for 10 minutes at the same temperature.

To this solution, 0.8 mL of tellurium dissolved in TOP: Te-TOP was added, and then the reaction solution was heated to 200° C. and stirred for 30 minutes while heating.

Ethanol was added to the obtained reaction solution to generate a precipitate, and the precipitate was collected through centrifugal separation. Then, toluene was added to this precipitate and dispersed to obtain a dispersion solution of AgInTe$_2$ particles.

The obtained dispersion solution was measured by an ultraviolet-visible and fluorescence spectrometer. As a result, similarly to FIG. 2 of Example 1, an absorption maximum was obtained at 962.0 nm, and similarly to FIG. 3 of Example 1, a fluorescence maximum was obtained at 1038.0 nm. The fluorescence full width at half maximum was about 100 nm, and the fluorescence quantum yield was 22%.

Figure 4A:
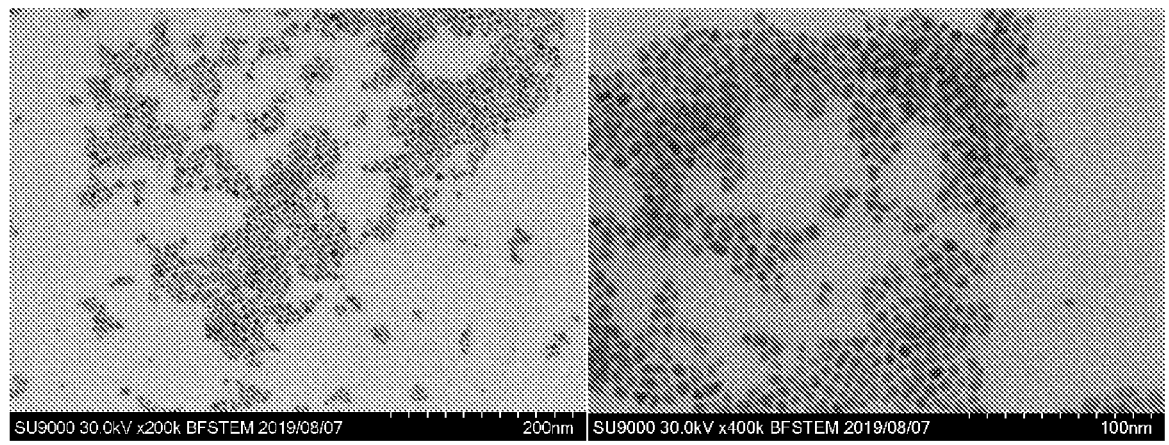
FIG. 4A is a scanning transmission electron microscope (STEM) photograph of AgInTe$_2$ in Example 1.
Figure 4B:
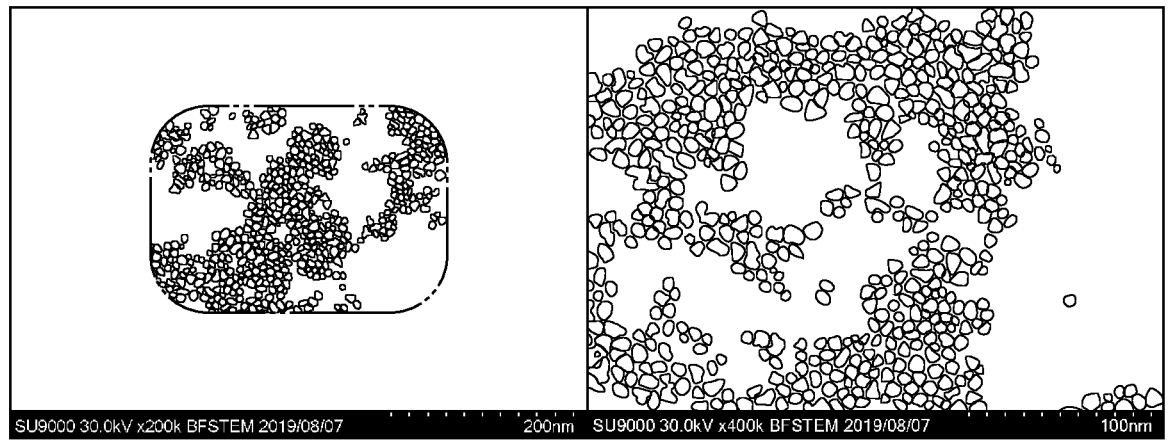
FIG. 4B is a schematic view of FIG. 4A. Note that, the left view of FIG. 4B is an extraction of a part of the left view of FIG. 4A.

As shown in FIGS. 4A and 4B, it was found that the average particle diameter of a number of quantum dots was 6.4 to 6.9 nm and 1 nm or more and 15 nm or less. Each particle diameter of 90% or more of quantum dots was included within an average particle diameter±1.7 nm. That is, it was found that each particle diameter of 90% or more of quantum dots was included within an average particle diameter±27%, and a number of quantum dots could be generated to have a uniform particle diameter.

Similarly to FIG. 5 of Example 1, from the peak value of the XRD spectrum of $AgInTe_2$, it was verified that an $AgInTe_2$ solid solution was generated.

Example 3

Into a 100 mL reaction container, 33.4 mg of silver acetate: Ag(OAc) and 10.0 mL of dodecanethiol: DDT were put. Then, the raw materials were dissolved by being heated while stirring at 120° C. for 10 minutes in an inert gas ($N_2$) atmosphere.

To this solution, 116.8 mg of indium acetate: $In(OAc)_3$ was added, and the resultant solution was further heated while stirring for 10 minutes at the same temperature.

To this solution, 0.4 mL of tellurium dissolved in TOP: Te-TOP was added, and then the reaction solution was heated to 200° C. and stirred for 30 minutes while heating.

Ethanol was added to the obtained reaction solution to generate a precipitate, and the precipitate was collected through centrifugal separation. Then, toluene was added to this precipitate and dispersed to obtain a dispersion solution of $AgInTe_2$ particles.

The obtained dispersion solution was measured by an ultraviolet-visible and fluorescence spectrometer. As a result, similarly to FIG. 2 of Example 1, an absorption maximum was obtained at 962.0 nm, and similarly to FIG. 3 of Example 1, a fluorescence maximum was obtained at 1038.0 nm. The fluorescence full width at half maximum was about 100 nm, and the fluorescence quantum yield was 22%.

It was found that the average particle diameter of a number of quantum dots was 2.4 to 2.7 nm and 1 nm or more and 15 nm or less. Each particle diameter of 90% or more of quantum dots was included within an average particle diameter±0.7 nm. That is, it was found that each particle diameter of 90% or more of quantum dots was included within an average particle diameter±30%, and a number of quantum dots could be generated to have a uniform particle diameter.

Similarly to FIG. 5 of Example 1, from the peak value of the XRD spectrum of $AgInTe_2$, it was verified that an $AgInTe_2$ solid solution was generated.

Comparative Example 1

Into a 100 mL reaction container, 38.3 mg of tellurium: Te, 33.4 mg of silver acetate: Ag(OAc), 116.8 mg of $In(OAc)_3$, 5.0 mL of dodecanethiol: DDT, and 20 mL of octadecene: ODE were put. Then, the raw materials were dissolved by being heated while stirring in an inert gas ($N_2$) atmosphere.

This solution was heated at 180° C. for 20 minutes while stirring. The obtained reaction solution ($AgInTe_2$) was cooled to room temperature. The reaction solution was turned into a black suspension, and no fluorescence was observed in a near-infrared region from the obtained solution.

As described above, according to Examples 1 to 3, it was found that quantum dots having an emission wavelength in a near-infrared region could be synthesized.

INDUSTRIAL APPLICABILITY

According to the present invention, it is possible to synthesize an $AgInE_2$ quantum dot having fluorescent emission and showing a high fluorescence quantum yield in a near-infrared region and a narrow fluorescence full width at half maximum by a method capable of mass production. By applying the quantum dot of the present invention to an optical communication device or the like, excellent near-infrared absorption and near-infrared light-emitting characteristics can be obtained in the device. In particular, the quantum dot of the present invention can be applied as biomaterials for chemotherapy, imaging of deep tissues in a living body, and the like. The $AgInE_2$ quantum dot is a promising alternate material for Cd, Pb, and Hg-based quantum dots in biomedical imaging.

The present application is based on Japanese Patent Application No. 2019-183077 filed on Oct. 3, 2019. The entire contents thereof are incorporated herein by reference.

The invention claimed is:

1. A quantum dot being a nanocrystal represented by $AgInE_2$ (E is at least one of tellurium, selenium, and sulfur) containing silver, indium, and chalcogen, wherein a fluorescence wavelength is within a range of a near-infrared region of 700 to 1500 nm, a fluorescence full width at half maximum is 150 nm or less, and a fluorescence quantum yield is higher than 20%.

2. The quantum dot according to claim 1, wherein an average particle diameter is 1 nm or more and 15 nm or less.

3. The quantum dot according to claim 1, wherein a surface of the quantum dot is covered with a ligand.

4. The quantum dot according to claim 3, wherein the ligand is selected from at least one of phosphine-based, aliphatic thiol-based, aliphatic amine-based, and aliphatic carboxylic acid-based ligands.

5. A method for producing a quantum dot, the method comprising:
synthesizing a quantum dot represented by $AgInE_2$ (E is at least one of tellurium, selenium, and sulfur) from a silver raw material, an indium raw material, and a chalcogenide raw material (chalcogenide is at least one of tellurium, selenium, and sulfur) by:
sequentially dissolving one or two of the silver raw material, the indium raw material, the chalcogenide raw material, and a ligand in a high-boiling point solvent heated from 60° C. to 120° C., the high-boiling point solvent having a boiling point of at least 150° C.;
sequentially adding the other remaining materials of the silver raw material, the indium raw material, the chalcogenide raw material, and the ligand; and
synthesizing the quantum dot by raising a temperature of the resultant solution to a reaction temperature of 180° C. or higher and 250° C. or lower after adding all of the raw materials and the ligand.

6. The method for producing a quantum dot according to claim 5, wherein the quantum dot is synthesized in a solvent containing thiol.

* * * * *